United States Patent [19]
McKinney

[11] Patent Number: 5,092,616
[45] Date of Patent: Mar. 3, 1992

[54] CONVERTIBLE WAGON/SCOOTER

[75] Inventor: James C. McKinney, Somerset, N.J.

[73] Assignee: WhatNot Inc., Cleveland, Ohio

[21] Appl. No.: 533,084

[22] Filed: Jun. 4, 1990

[51] Int. Cl.⁵ ............................................... B62B 3/02
[52] U.S. Cl. .................................. 280/87.043; 74/548; 280/7.14; 280/7.15; 280/30; 280/47.371
[58] Field of Search .................. 280/7.1, 7.14, 7.15, 280/267, 30, 87.041, 87.01, 87.021, 87.043, 47.371; 74/548, 543

[56] References Cited

U.S. PATENT DOCUMENTS

| | | | |
|---|---|---|---|
| 1,318,847 | 10/1919 | Clockers | 280/87.043 |
| 1,806,961 | 5/1931 | Waas | 280/87.043 |
| 4,958,843 | 9/1990 | Cole | 280/30 |

FOREIGN PATENT DOCUMENTS 433998 10/1967 Switzerland ..................... 280/7.14

Primary Examiner—Andres Kashnikow
Assistant Examiner—Eric Culbreth
Attorney, Agent, or Firm—Connolly & Hutz

[57] ABSTRACT

A convertible wagon/scooter is in the form of a body and step assembly mounted on a set of front wheels and a set of rear wheels. The front wheels are connected to a pivotal mount so that the assembly is steerable. A detachable steering mechanism may be secured directly to the set of front wheels when the assembly is to be used as a wagon. Alternatively the detachable steering mechanism may be mounted to the assembly near the rear thereof and connected to the front set of wheels by a link mechanism when the assembly is to be used as a scooter.

16 Claims, 5 Drawing Sheets

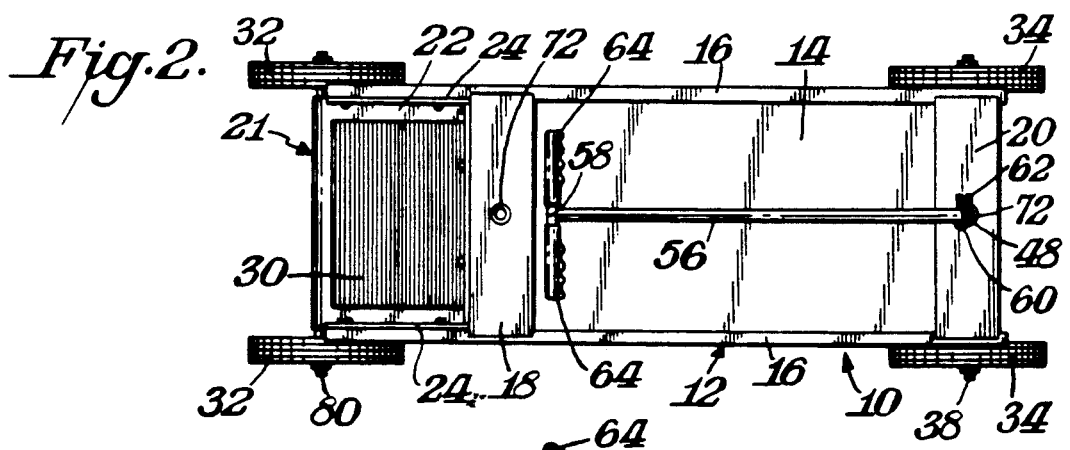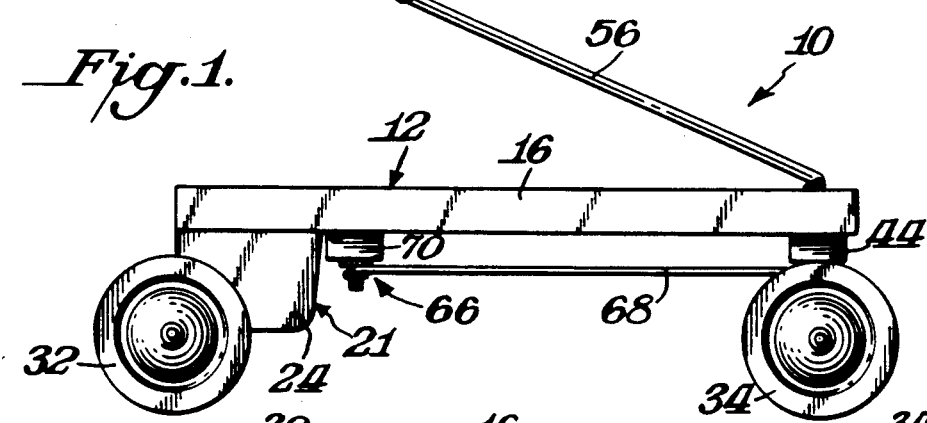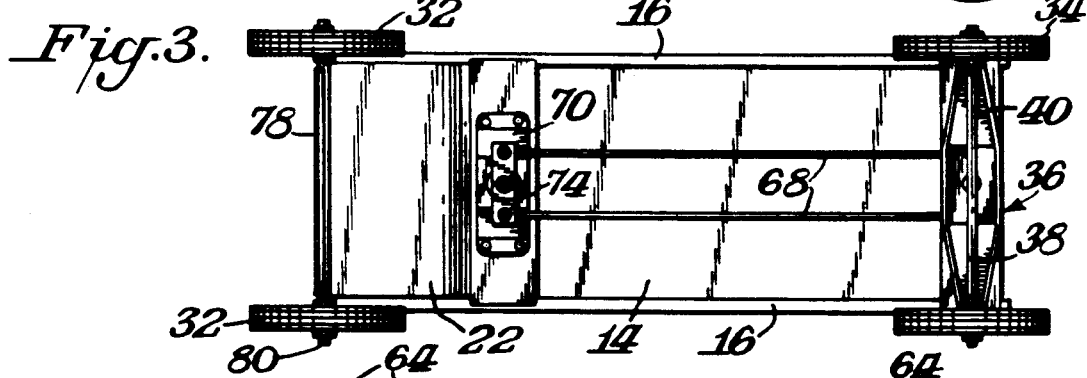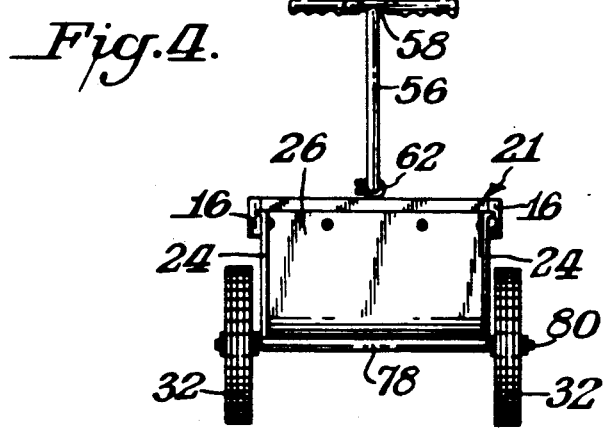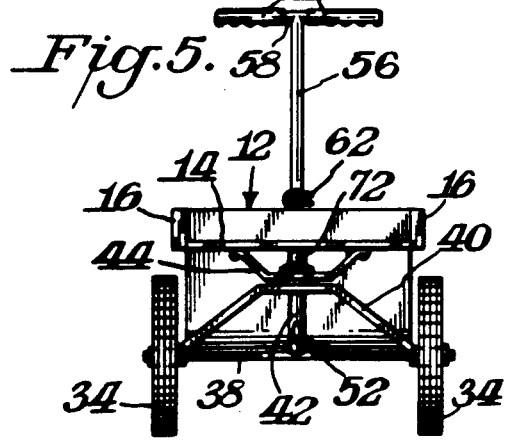

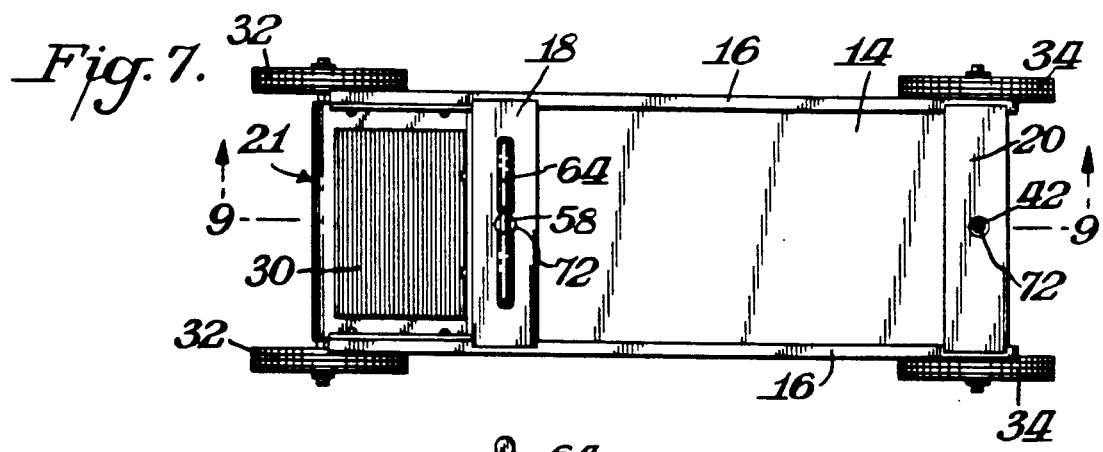
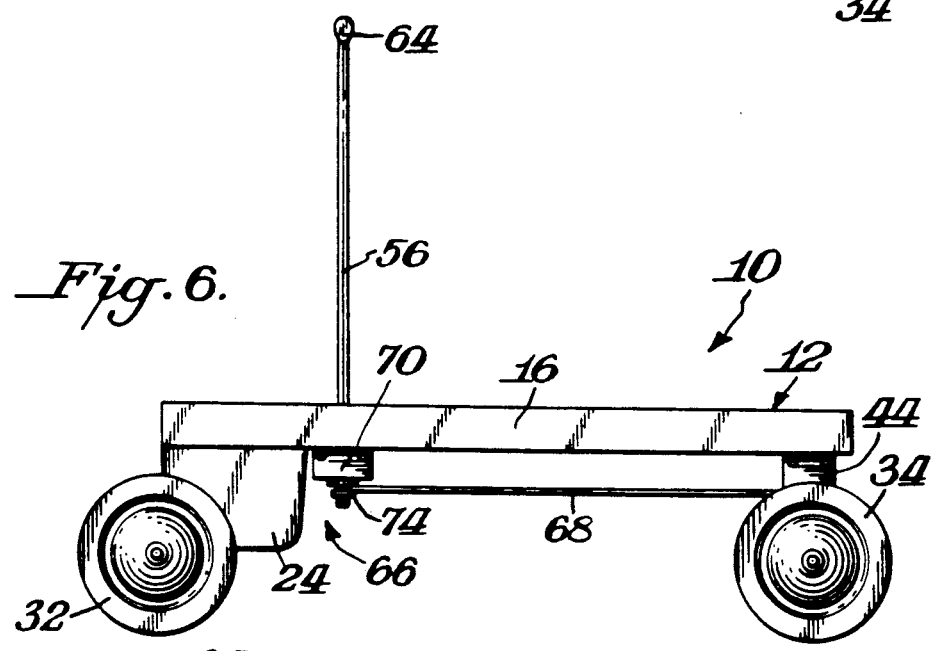
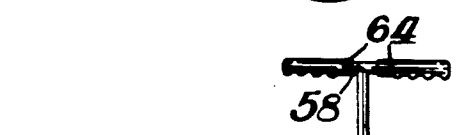
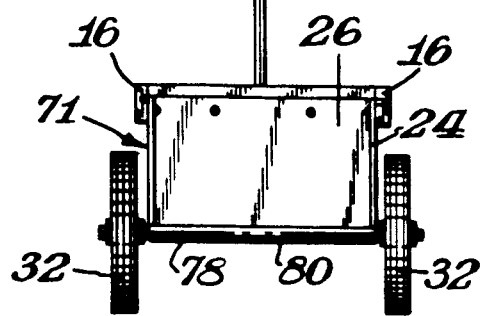

CONVERTIBLE WAGON/SCOOTER

BACKGROUND OF INVENTION

There presently exists wagons in various forms which serve the purpose of being amusement devices for children or serve functional purposes such as facilitate the transporting or carrying of articles. Another form of recreational device in common usage is a scooter. Such scooters generally take the form of an elongated horizontal member mounted on sets of wheels wherein the user would step on the rear portion of the body and would steer the scooter by a steering mechanism disposed in the general location of the user.

Another common recreational device is a sled which, as with wagons and scooters, is frequently used by children, although sleds represent recreational activities for adults as well. Sleds generally include a steering mechanism at the front with ski type runners rather than wheels as is used with wagons and scooters.

SUMMARY OF INVENTION

An object of this invention is to provide a combination wagon and scooter which may be easily converted from one type of device to another.

A further object of this invention is to provide such a device which has a detachable steering mechanism capable of being mounted selectively to either the front or the rear of the device in accordance with its mode as a wagon or scooter.

A still further object of this invention is to provide such a device which likewise may be used as a sled.

In accordance with this invention the convertible wagon/scooter is in the form of a body and step assembly mounted on a set of rear wheels and on a set of front wheels. The front wheels are secured to a pivotal mount to permit the assembly to be capable of changing its direction. A steering mechanism is detachably mounted to the pivotal mount to permit the assembly to be steered. When the steering mechanism is mounted to the front of the assembly, the assembly functions as a wagon. Alternatively, when the steering mechanism is mounted in the rear of the assembly and connected to the front wheels by a link mechanism, the assembly is capable of being used as a scooter.

In accordance with a further embodiment of this invention ski type runners may be secured to the assembly either as a complete replacement for the wheels or disposed lower than the wheels so that the assembly may function as a sled.

THE DRAWINGS

FIG. 1 is a side elevation view of a convertible wagon/scooter shown in its wagon mode in accordance with this invention;

FIGS. 2-3 are top and bottom plan views, respectively, of the wagon/scooter shown in FIG. 1;

FIGS. 4-5 are rear and front elevation views, respectively, of the wagon/scooter shown in FIGS. 1-3;

FIG. 6 is a side elevation view of the wagon/scooter shown in FIGS. 1-5 in its scooter mode;

FIG. 7 is a top plan view of the wagon/scooter shown in FIG. 6;

FIG. 8 is a rear end elevation view of the wagon/scooter shown in FIG. 7;

FIG. 9 is a cross-sectional view taken through FIG. 7 along the line 9—9;

DETAILED DESCRIPTION

Figure 11:
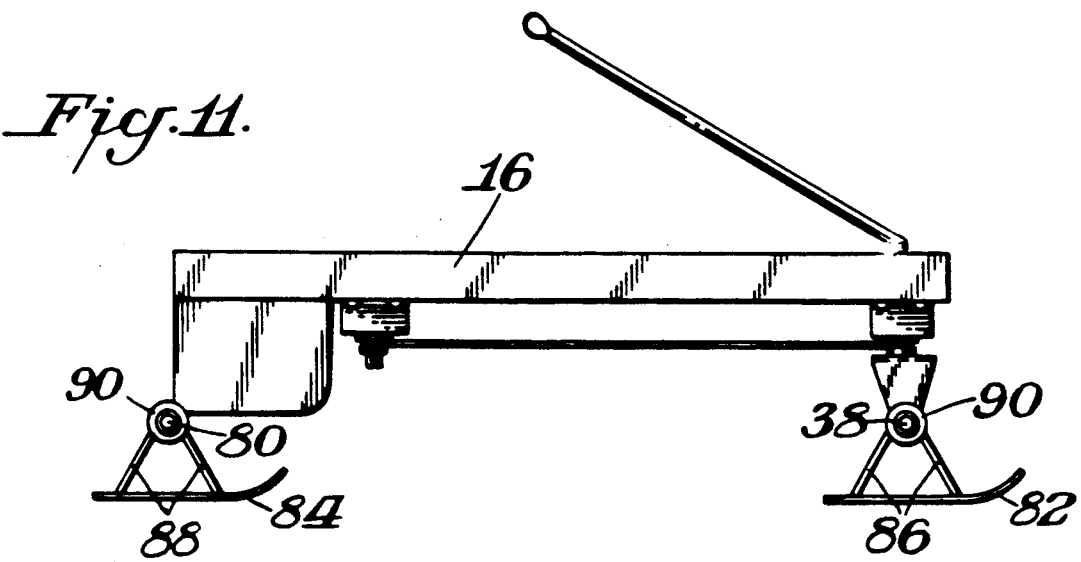
FIG. 11 is a side elevation view of the wagon/scooter shown in FIGS. 1-10 in its sled mode of operation.
Figure 12:
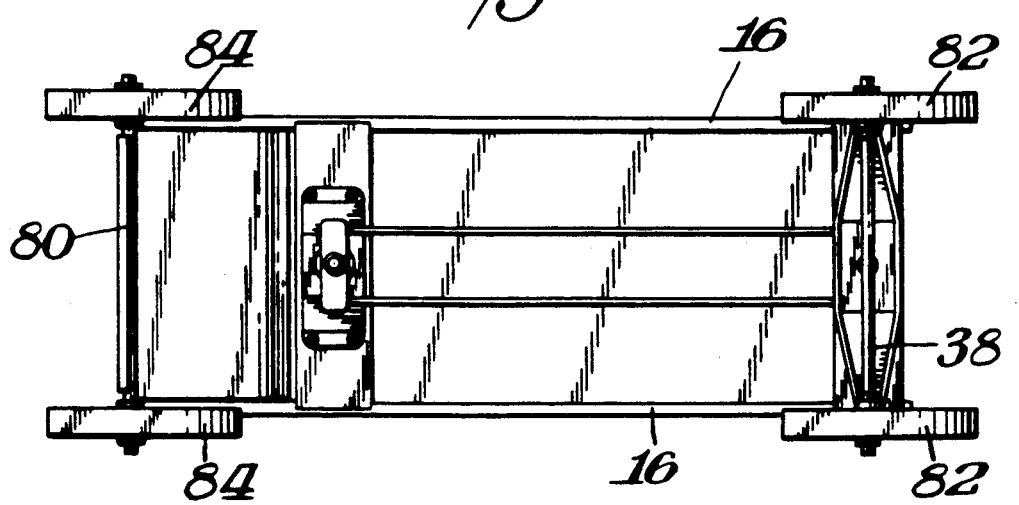
FIG. 12 is a bottom plan view of the wagon/scooter shown in FIG. 11.
Figure 13:
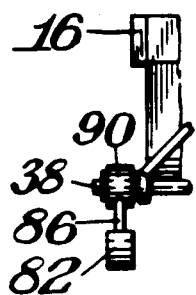
FIG. 13 is a fragmental elevation view of a portion of the wagon/scooter shown in FIGS. 11-12.

FIGS. 1-10 show a convertible wagon/scooter device 10 in accordance with this invention. As shown therein, the device 10 is in its wagon mode in FIGS. 1-5 and is in its scooter mode in FIGS. 6-10. FIGS. 11-13 represent a further modification of this invention wherein the same device is capable of being used as a sled.

Device 10 includes a body member 12 of any suitable construction and preferably has a horizontal platform 14 with a pair of upstanding side walls 16,16. The rear wall 18 is formed by a block mounted to side walls 16,16. As shown, for example, in FIGS. 2-3 and 7 side walls 16 extend beyond rear wall 18 as later described. A front wall 20 is formed by a block mounted between side walls 16,16. Platform 14 terminates at rear wall 18 and a step 21 is secured between side walls 16,16 beyond rear wall 18. The step 21 is in the form of a horizontal support surface 22 and upstanding side walls 24,24 which are connected to side walls 16,16. The step also includes upstanding side wall 26 which is connected to block 18. The various side walls 24,26 may be connected in any suitable manner, such as by screws 28. A non-skid surface, such as a grooved rubber mat 30 is disposed on lower surface 22 to provide friction and minimize the tendency for the user's foot to slip off lower surface 22 when device 10 is used as a scooter.

Figure 9:
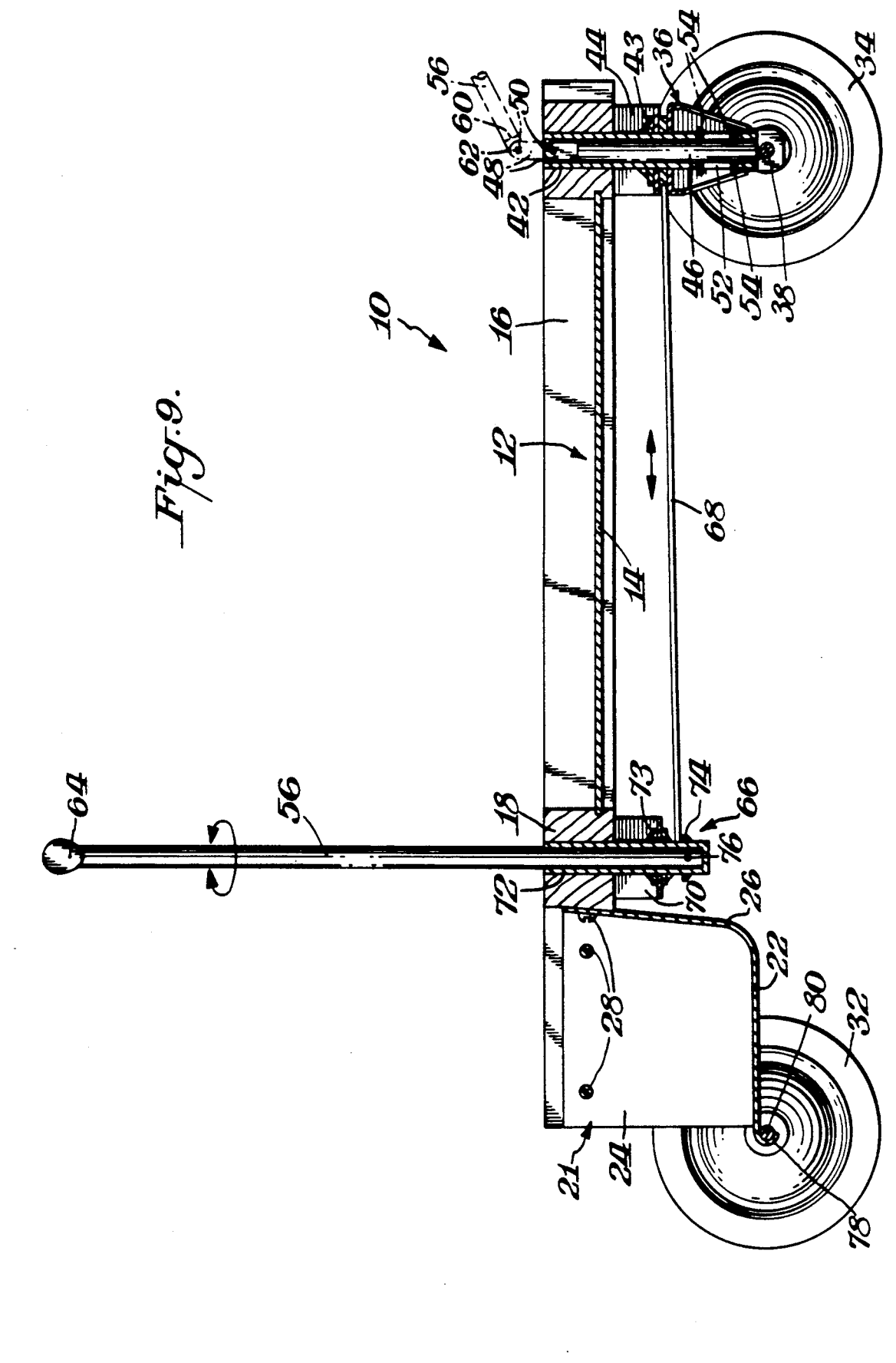

As illustrated in the various figures, body 12 and its step extension form an assembly mounted on a rear set of wheels 32,32 and on a front set of wheels 34,34. Wheels 34,34 are secured to a pivotal mount 36 so that the front wheels 34,34 may be steered. As best shown in FIGS. 3, 5 and 9 pivotal mount 36 includes an axle 38 onto which each wheel 34 is secured. An inverted U-bracket 40 is secured at each end of axle 38. A hollow tube or column 42 extends through the upper surface of bracket 40 and is fixedly mounted to axle 38. The subassembly comprising the wheels 34,34, axle 38, bracket 40 and column 42 comprises a rigid sub-assembly which may be rotated in its entirety. Column 2 rotates in bearing 43. Mount 36 also includes a smaller U-bracket 44 fixedly secured by any suitable means such as screws to the underside of platform 14. Column 42 extends through the horizontal surface of U-bracket 44 and extends through an opening through front block 20 and terminates at the upper surface of front block 30. A post 46 having a generally cylindrical body section which conforms to the inside diameter of tubular column 42 is slidably positioned in column 42. Post 46 terminates at its upper end in a flat portion 48 having a hole 50 extending therethrough. A pair of slots 52,52 are formed in column 42 into which a pair of pins 54,54 are slidably disposed. Pins 54,54 are rigidly connected to post 46. Thus, the extent of inward and outward sliding of post 46 in column 42 is controlled by the length of slots 52 since the slots act as tracks to limit the movement of pins 54,54. When pins 54,54 are in their lowermost position in slots 52,52 the upper tip of tongue or flattened portion 48 is flush with or slightly recessed below the upper surface of block 20. When pins 54,54 are in their uppermost position in slots 52,52 substantially the entire portion of flattened portion or tongue 48 is extended above the upper surface of block 20. Pins 54,54 are readily accessible to permit the post 46 to be moved up and down in column 42.

A steering mechanism is detachably secured to mount 36. The steering mechanism comprises a elongated handle 56 having lateral extensions 58 at its upper end thereof in the form of handle bars which are shaped for convenient grasping by the user. Gripping sleeves 64 made of any suitable material such as rubber which contain indentations for receiving the fingers of the user's hand are mounted on the handle bars.

The lower end of handle 56 terminates in a bifurcation or fork 60 having a pair of holes which may be aligned with hole 50 in tongue 48. In this manner, handle 56 may be secured to post 46 by a suitable fastening device, such as cotter pin 62 being inserted through the aligned holes in fork 60 and hole 50 of tongue 48. Pin 62 functions as a horizontal pivot axis for handle 56. When it is desired to secure handle 56 to mount 36, pins 54,54 are raised to fully expose tongue 48 so that tongue 48 can slip between the forked end 60 of handle 56 and then be secured thereto by pin 62. Post 46 then slides back to its fully retracted position under the influence of gravity or as aided by downward pushing on pins 54. Rotation of handle 56 thus controls the direction of wheels 34,34 by turning column 42 about its vertical axis.

When handle 56 is attached directly to post 46 of the front set of wheels as shown in FIGS. 1-5, device 10 functions as a wagon which could be pulled by the user and wherein objects could be inserted in the body 12 directly on platform 14 and confined in body 12 by the upstanding peripheral walls 16,18,20.

A further feature of this invention would be the incorporation of a detachable or fixed seat on the body 12 particularly when the device 10 is used as a wagon so that a child could sit on the seat and be pulled. Such could also be rotatably mounted.

As previously indicated, a unique feature of device 10 is that it may be readily converted to and from a wagon to a scooter. The conversion to a scooter is accomplished by detaching handle 56 from its connection with post 46 and then transmitting the rotation of handle 56 to the front wheels 34,34 by means of a link mechanism 66. The link mechanism is best illustrated in FIGS. 3 and 9. As shown therein, link mechanism 66 includes a pair of parallel rods 68,68. The front end of each rod 68 is downwardly turned and secured to the horizontal portion of bracket 40 so that movement of rods 68 is transmitted to bracket 40 to cause the bracket to pivot. A further inverted U-shaped bracket 70 is secured to the underside of block 18. A tubular column 72 is connected to bracket 70 with the upper end of column 72 terminating generally flush with the upper surface of block 18. The lower end of tube 72 passes through bracket 70 and is rigidly attached to plate 74. Column 72 rotates in bearing 73. The rear ends of rods 68 are in turn downwardly turned and pivotally mounted through plate 74. Thus, rotation of column 72 is transmitted to its rigidly mounted plate 74 which in turn is transmitted to rods 68 which in turn is transmitted to bracket 40 for thereby causing the front wheels 34,34 to turn. Column 72 is provided with a hole extending completely thereto. The hole would be aligned with hole 76 in the end of handle 56 when handle 56 is completely inserted into column 72. Handle 56 would be rigidly secured to handle 72 by inserting a pin or other suitable fastener through hole 76 and the aligned hole of tube 72. In this manner, rotation of handle 56 is thereby transmitted to front wheels 34,34.

Figure 10:
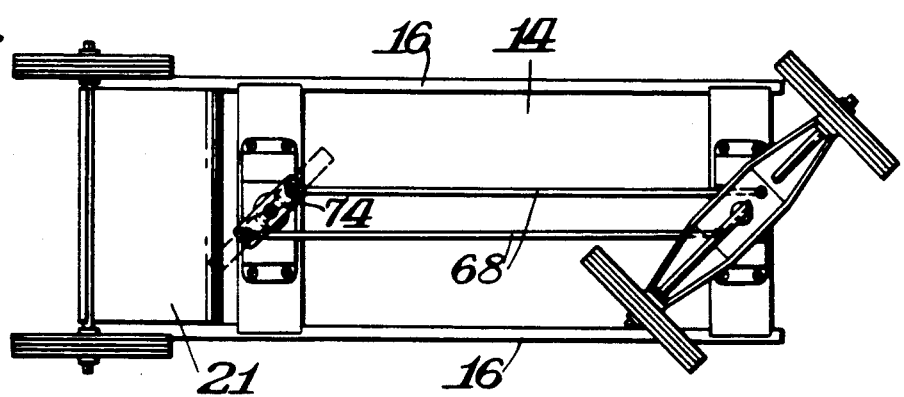
FIG. 10 is a bottom plan view of the wagon/scooter shown in FIGS. 6-9.

FIG. 10 illustrates how the link mechanism 66 is such that plate 74 and bracket 40 are always disposed parallel to each other. Accordingly, the device would be steered in the same manner when the handle 56 is attached to the front mount 36 or is attached to rear column 72.

When handle 56 is connected to column 72 in the rear portion of body 12 device 10 may be used as a scooter. In this respect, the user would step on mat 30 of lower surface 22 and steer the device by holding handle bars 58 and thereby manipulating handle 56. Conversely when handle 56 is secured to tongue 48, movement of handle 56 is transmitted directly to front wheels 34 by the connection of handle 56 to post 46 which in turn is locked to column 42 by means of pins 54 extending through slots 52 in column 42.

As shown in FIG. 9, the floor or lower surface 22 of the step terminates in a curled end 78 which is wrapped around axle 80 onto which rear wheels 32,32 are mounted.

As can be appreciated the detachability of handle 56 is a key feature of this invention which permits the device to be readily converted from a wagon to a scooter in accordance with the desired mode. Advantageously when handle 56 is mounted to the tongue 48 on post 46 in front column 42, the pivotal connection is located immediately above the upper surface of block 20. By such location of the pivotal connection handle 56 may be rotated while disposed at any angle above the horizontal and to some extent even at an angle slightly below the horizontal depending on the distance that the pivotal connection is above the upper surface of block 20. This freedom in disposing the handle at virtually any angle is particularly desirable when device 10 is used as a wagon since it permits the user to elevate or lower the handle as desired.

When device 10, however, is used as a scooter, the connection of handle 56 with rear column 72 is made below body 12 so that handle 56 is supported over a certain of its length where it is telescoped into column 72 thereby always maintaining handle 56 in a vertical position. When device 10 is used as a scooter it is desired that the steering mechanism always be maintained vertically so that the steering is effectuated by the simple rotation of the vertically disposed handle 56.

FIGS. 11-13 show a further feature of this invention wherein device 10 is capable of being converted to a sled. This is accomplished by mounting sets of ski type runners 82,84 in the front and rear of the assembly. In the preferred practice of this invention the individual runners are mounted directly to axles 38 and 80 after the wheels 32 and 34 are detached from the respective axles. The invention may also be practiced by having the spokes 86,88 of sufficient length that when the ski runners 82,84 are mounted to the axles 38, 80 the wheels need not be removed since the spokes would be of a length greater than the radius of the wheels so that the runners 82,84 would extend below the wheels. A further alternative would be to use a single pair of ski runners of a sufficient length to extend beyond the complete length of device 10 rather than having separate sets of runners attached at the front and rear ends thereof. Handle 56 could be mounted to either the front or the rear of the device when it is used in its sled mode.

A further feature of this invention, which is particularly desirable when device 10 is used as a sled is the sloping of the corner where the sides 24,26 merge with the bottom 22 of step 21. This curved forward portion of step 21 is desirable to provide less resistance when, for example, the device travels over piles of snow. The curved portion of step 21 directs piles of snow away from device 10 as it rides on runners 82,84.

When device 10 is used as a sled, it is in the concept of this invention to utilize a handle 56 of much shorter length than the type of handle that would be used for the device when used as a wagon or scooter. In this respect, a separate handle similar to handle 56 could be provided which terminates substantially flush with the top of block 20 so that a user may lay on the device and have the handle bars readily accessible without having to stretch upwardly the handle bars and steer the sled.

In the preferred practice device 10 would be converted to a sled by mounting the handle 56 or a shortened version thereof to front column 42 and by attaching ski type runners to the device. In the illustrated embodiment the attachment is made by first detaching the wheels 32,34 and then attaching the runners by securing the support rings 90 of the runners directly on the axles 38,80. As previously noted, however, the attachment could be accomplished in other matters whereby the wheels would not have to be attached to the device as long as the runners are disposed below the wheels. Additionally, instead of having separate sets of runners at the front and rear of device 10 a single set of runners having a length longer than the length of device 10 could be attached to front axle 38.

Device 10 thus provides a structure where with minor adjustments the device may be selectively used as a wagon or as a scooter or as a sled.

What is claimed is:

1. A convertible wagon-scooter device comprising a body having a generally horizontal support surface, a step mounted to said body, said step having a support surface disposed below said body support surface, said body and said step comprising an assembly with said step being rearward of said body, a mounting block at the junction of said body and said step, said mounting block extending across and upwardly from said horizontal surface to comprise a divider between said horizontal surface and said step with said mounting block being the rear wall of said body, a set of front wheels mounted to the front end of said assembly, a set of rear wheels mounted to the rear end of said assembly whereby said assembly may be moved by said wheels, said front wheels being connected to said assembly by a front pivot mount to permit said front wheels to rotate about a vertical axis for changing the direction of movement of said assembly, a rear pivot mount connected to said assembly for pivoting about a vertical axis, a link mechanism connecting to said front pivot mount to said rear pivot mount for joint rotation, a handle, said handle being selectively detachably connected to said front pivot mount and to said rear pivot mount for selective use of said device as a wagon when said handle is connected to said front pivot mount and as a scooter when said handle is connected to said rear pivot mount, said front pivot mount including a hollow vertical front column rotatably connected to said body for rotation about a vertical axis, said front wheels being connected to said front column, a post telescopingly slidably mounted in said front column and terminating at the top of said front column, connecting means securing said post to said front column for joint rotation therewith, said handle having a locking member at its lower end, said handle being pivotally and detachably connected at said locking member to the top of said post with said lower end of said handle substantially exposed whereby said handle may be disposed in variable angular orientations, said rear pivot mount including a hollow rear column disposed in said mounting block and rotatably connected to said assembly for rotation about a vertical axis, and said handle being detachably inserted into said rear column and detachably connected to the lower portion of said rear column whereby said handle may rotate jointly with said rear column and said handle is locked in a vertical orientation.

2. The device of claim 1 wherein said wheels are detachably mounted to said assembly, and ski runners detachably mounted to said assembly when said wheels are detached therefrom whereby said device may function as a sled.

3. The device of claim 1 wherein said handle is detachably connected to said front mount by pivot means which permits said handle to be disposed in variable angular orientations.

4. The device of claim 3 wherein said handle is detachably connected to said rear mount by rigid means for maintaining said handle pivotably about said vertical axis.

5. The device of claim 4 wherein said front mount includes a hollow vertical front column rotatably connected to said body for rotation about said vertical axis, said front wheels being connected to said front column, a post telescopically slidably mounted in said front column, connecting means securing said post to said front column for joint rotation therewith, and said pivot means detachably connecting said handle to said post.

6. The device of claim 5 wherein said rear mount includes said hollow rear column rotatably connected to said assembly for rotation about a vertical axis, and said handle being detachably inserted into said rear column and detachably connected thereto to comprise said rigid means.

7. The device of claim 6 wherein alignable holes are in said handle and said rear column, and a pin detachably positioned in said alignable holes.

8. The device of claim 6 wherein said front wheels are mounted on a front axle, a front lower bracket connected to said front axle, a front upper bracket connected to said body, said front column connected to said front lower bracket, front bearing means connecting said front column to said front upper bracket, a rear upper bracket connected to said body, said front column connected to said front lower bracket, front bearing means connecting said front column to said front upper bracket, a rear upper bracket connected to said body, rear bearing means connecting said rear column to said rear upper bracket, a plate connected to said rear column, and said link mechanism including a pair of rods connecting said plate to said front lower bracket with said columns being disposed between said rods whereby the rotational movements of said plate and said front lower bracket are transmitted to each other.

9. The device of claim 6 wherein said step comprises said support surface and two upstanding side walls and an upstanding front wall with said step being open at its top and rear.

10. The device of claim 9 wherein said body includes four upstanding side walls peripherally around said body support surface, and said step walls being connected to extensions of said body walls.

11. The device of claim 10 wherein said step support surface and said step walls are joined together at the front end of said step with the lower portion of said front end being curved.

12. The device of claim 11 wherein said wheels are detachably mounted to said axles, and ski runners for being detachably mounted to said axles when said wheels are detached therefrom whereby said device may function as a sled.

13. A convertible wagon-scooter device comprising a body having a generally horizontal support surface, a step mounted to said body, said step having a support surface disposed below said body support surface, said body and said step comprising an assembly with said step being rearward of said body, a set of front wheels mounted to the front end of said assembly, a set of rear wheels mounted to the rear end of said assembly whereby said assembly may be moved by said wheels, said front wheels being connected to said assembly by a front pivot mount to permit said front wheels to rotate about a vertical axis for changing the direction of movement of said assembly, a rear pivot mount connected to said assembly for pivoting about a vertical axis, a link mechanism connecting said front pivot mount to said rear pivot mount for joint rotation, a handle, said handle being selectively detachably connected to said front pivot mount and to said rear pivot mount for selective use of said device as a wagon when said handle is connected to said front pivot mount and as a scooter when said handle is connected to said rear pivot mount, said handle being detachably connected to said front mount by pivot means which permits said handle to be disposed in variable angular orientations, said handle being detachably connected to said rear mount by rigid means for maintaining said handle pivotable about said vertical axis, said front mount including a hollow vertical front column rotatably connected to said body for rotation about said vertical axis, said front wheels being connected to said front column, a post telescopingly slidably mounted in said front column, connecting means securing said post to said front column for joint rotation therewith, said pivot means detachably connecting said handle to said post, said rear mount including a hollow rear column rotatably connected to said assembly for rotation about said vertical axis, said handle being detachably inserted into said rear column and detachably connected thereto to comprise said rigid means, and said connecting means comprising a pair of diametrically oppositely disposed slots in said front column and a pair of pins on said post extending through said slots for sliding up and down in said slots.

14. The device of claim 13 wherein said post terminates in a tongue at its upper end, a hole extending through said tongue, said handle having a hole alignable with said hole of said tongue, and a pin extending through said holes of said tongue and said handle to comprise said pivot means.

15. The device of claim 14 wherein said tongue is located above said front column fully exposed when said post pins are in their uppermost position in said slots, said tongue being completely within said column when said post pins are in their lowermost position in said slots, and said front column terminating at its upper end no greater than said body so as to avoid projecting outwardly of said body.

16. The device of claim 15 wherein said handle terminates in a bifurcation with said handle hole extending completely therethrough, and said tongue being disposed in said bifurcation.

* * * * *